(No Model.)

J. DEMAREST.
VALVE FOR WATER CLOSETS.

No. 352,643. Patented Nov. 16, 1886.

Witnesses
Harold Serrell
Chas. H. Smith

Inventor
John Demarest
per Lemuel W. Serrell
Atty.

UNITED STATES PATENT OFFICE.

JOHN DEMAREST, OF NEW YORK, N. Y., ASSIGNOR TO THE J. L. MOTT IRON WORKS, OF SAME PLACE.

VALVE FOR WATER-CLOSETS.

SPECIFICATION forming part of Letters Patent No. 352,643, dated November 16, 1886.

Application filed June 14, 1886. Serial No. 205,060. (No model.)

*To all whom it may concern:*

Be it known that I, JOHN DEMAREST, of the city, county, and State of New York, have invented a new and useful Improvement in Valves for Water-Closets, of which the following is a specification.

My present invention relates to a water-closet valve adapted for use in closets such as are described and shown in Letters Patent heretofore granted to me, No. 195,705, October 2, 1877, and No. 199,418, January 22, 1878.

The special object of this invention is to vary the water-supply according to the pressure of water without the necessity of changing the valve-case or attachments to the closet and to facilitate the connections of the water-pipes.

Figure 1:
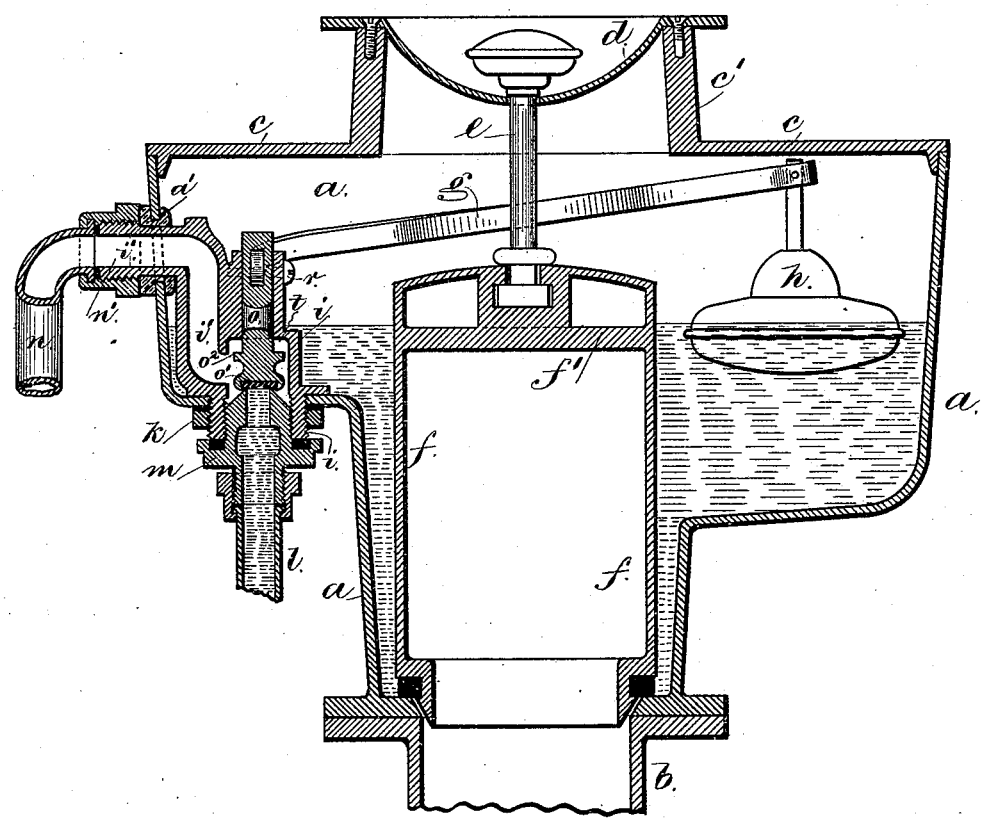
Figure 2:
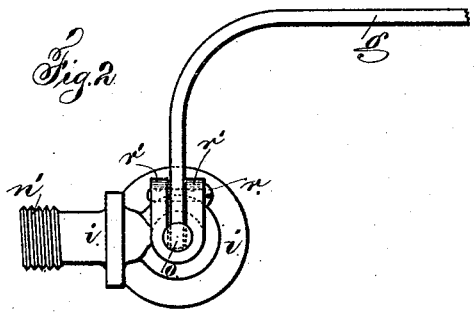

In the drawings, Figure 1 is a vertical section transversely of the valve-chamber, and Fig. 2 is a plan of the valve.

The valve-chamber $a$, pipe $b$, cover $c$, cylindrical portion $c'$ to the cover, cup $d$, rod and handle $e$, cylinder $f$, and its dam $f'$, the lever $g$, and float $h$ are all similar to the parts shown and described in my aforesaid patents, and do not need further description.

The valve-case $i$ is composed of a hollow cast-metal body through which passes a right-angled water-channel, $i'$. The base of the valve-case $i$ passes through the shell of the valve-chamber and is securely held by a nut, $k$, and the upper portion of the valve-case $i$ passes through the side casing of the valve-chamber $a$, and the joint at $a'$ is made tight with washers, or in any other desired manner.

The supply-water pipe $l$ is connected to a removable tubular plug, $m$, which plug is screwed into the base of the valve-case $i$, and the upper surface of said plug is conical to form a valve-seat, the hole through the plug being varied in size in different plugs to adapt the valve to use in places having different water-pressures. The flushing-pipe $n$ is connected to the screw end $n'$ of the valve-case $i$, and said pipe $n$ leads to and is connected with the water-closet bowl.

The spindle $o$ passes through the body of the valve, and the upper end is slotted for the end of the lever $g$, which lever is pivoted by the screw $r$ in lugs $r'$ upon the side of the valve $i$. The lower end of the spindle $o$ forms the valve, and it is recessed to receive the disk $o'$, of elastic material, and said spindle is made with a flange, $o^2$, which takes a bearing and forms a valve against the seat $t$ when the spindle is raised by the float $h$ falling. When the float is raised, the stem is depressed and the disk $o'$ rests upon the conical end of the plug $m$ and shuts off the supply of water.

I claim as my invention—

In an automatic water-closet valve, the valve-case having a flange and nut for clamping to the valve-chamber, and an inlet at the lower end, and a lateral discharge-pipe at one side, in combination with a flat valve, a cylindrical stem sliding in the upper part of the valve-case, and a lever and float for the same, and a valve-seat having an exterior conical surface at the top and screwed into the lower end of the valve-case, so as to be changeable to adapt the valve to different pressures of water, substantially as specified.

Signed by me this 9th day of June, A. D. 1886.

JOHN DEMAREST.

Witnesses:
R. W. HALLEY,
MAX GOEBEL.